United States Patent
Lyons

[11] Patent Number: 6,069,666
[45] Date of Patent: May 30, 2000

[54] BROADCAST STUDIO SYNCHRONIZATION DISTRIBUTION SYSTEM AND METHOD

[75] Inventor: Paul Wallace Lyons, New Egypt, N.J.

[73] Assignee: Sarnoff Corporation, Princeton, N.J.

[21] Appl. No.: 09/126,050

[22] Filed: Jul. 30, 1998

Related U.S. Application Data

[60] Provisional application No. 60/077,971, Mar. 13, 1998.

[51] Int. Cl.[7] .................................................. H04N 9/475
[52] U.S. Cl. ........................ 348/512; 348/521; 348/722; 348/536
[58] Field of Search ...................... 348/512, 515, 348/536, 537, 722, 521, 516, 524, 6, 8; 455/3.1, 4.1, 4.2, 6.3; H04N 9/475, 5/06, 5/222

[56] References Cited

U.S. PATENT DOCUMENTS 5,880,792  3/1999  Ward ........................................ 348/722

FOREIGN PATENT DOCUMENTS 942606  9/1999  European Pat. Off. .

Primary Examiner—Sherrie Hsia
Attorney, Agent, or Firm—William J. Burke

[57] ABSTRACT

A system and method for distribution of a clock signal of a new timing reference which may employ an existing NTSC distribution network present in a conventional NTSC studio. NTSC-compliant horizontal, vertical, or other composite synchronization signals are generated from an HDTV primary reference clock, and are synchronized and locked to the HDTV primary reference, for distribution over the existing NTSC distribution network. HDTV studio components receive the horizontal, vertical, or other composite synchronization signals and generate a local HDTV clock signal using a phase-locked loop frequency synthesizer. The signal generated by the phase-locked loop frequency synthesizer is synchronized and locked to the HDTV primary reference.

14 Claims, 1 Drawing Sheet

BROADCAST STUDIO SYNCHRONIZATION DISTRIBUTION SYSTEM AND METHOD

This application claims the benefit of the filing date of U.S. provisional application No. 60/077,971, filed on Mar. 13, 1998, as attorney docket no. SAR 12586P.

This invention was made under U.S. Government Contract 14911 70NANB5H1174. The Government has certain rights in the invention.

The present invention is directed to synchronization distribution, and, more particularly, to synchronization of new and existing timing references to a new reference signal.

BACKGROUND OF THE INVENTION

Many applications for video/audio production and transmission within a broadcast studio require that equipment within the broadcast studio be synchronized to a common reference. Currently, many broadcast studios conform to an NTSC standard, including synchronization of studio equipment to an NTSC reference, which equipment receives and synchronizes to NTSC timing signals from an NTSC distribution network of the studio. Many broadcast studios, however, will soon broadcast high definition television (HDTV) signals.

An HDTV digital broadcast studio may be required to produce video/audio data streams compliant with specifications set forth in the Advanced Television Standards Committee (ATSC) Digital Television Standard. These ATSC-compliant data streams are required to be compliant with the MPEG-2 systems level standards as set forth in ISO/IEC 13818-1 recommendation H.222.0. Equipment of a broadcast studio may dynamically switch between program sources to produce a compliant output video data stream for transmission. File servers, tape players, encoders, satellite links, networks and possibly other program sources may contain either pre-recorded or live video data streams that must be switched at various points throughout the studio. The MPEG-2 standard requires the output video data stream to contain a Program Clock Reference (PCR) that has a frequency tolerance of 30 parts-per-million (ppm) and a rate-of-change specification less than $75 \times 10^{-3}$ Hz/sec. The PCR specification permits the PCR to change one cycle in frequency over 13⅓ seconds. The MPEG-2 standard further notes that "Sources of coded data should follow a tighter tolerance in order to facilitate compliant operation of consumer recorders and playback equipment."

A conventional NTSC broadcast studio is synchronized (frequency-locked) to a primary NTSC reference that facilitates timing the studio program sources and sinks to a common reference. HDTV digital broadcast studios require distribution of HDTV synchronization signals to HDTV digital devices that are required to process digital streams for broadcast. An NTSC broadcast studio already has a large investment in a synchronization distribution system that synchronizes the various NTSC video components to the NTSC reference. The digital devices, however, require synchronization to a 27-MHz reference clock, not to the horizontal and vertical signals traditionally distributed throughout an NTSC studio by the NTSC distribution network.

SUMMARY OF THE INVENTION

The present invention relates to a system and method of synchronizing components to an HDTV primary reference clock signal. A system in accordance with the present invention generates a video sync signal synchronized to the HDTV primary reference clock signal and distributes the video sync signal to one or more of the components through a timing distribution network. Each component generates a local HDTV clock signal from the video sync signal, wherein the local HDTV clock signal is synchronized to the HDTV primary reference clock signal.

BRIEF DESCRIPTION OF THE DRAWINGS

The aforementioned features and benefits of the invention will be better understood from a consideration of the detailed description which follows taken in conjunction with the accompanying drawings, in which.

DETAILED DESCRIPTION

The present invention relates to a system and method for synchronizing components to an HDTV timing reference employing a timing distribution network that may already exist in a conventional NTSC broadcast studio. The HDTV timing, or primary, reference may be, for example, a 27-MHz Program Clock Reference. Further, the HDTV primary, reference may be found in MPEG-2 type systems installed in an existing NTSC studio. In the preferred embodiment of the present invention, NTSC-compliant horizontal, vertical, or other composite synchronization signals are generated from an HDTV primary reference clock, and are synchronized and locked to the HDTV primary reference, for distribution over an existing NTSC distribution network. A phase-locked loop frequency synthesizer of an HDTV component coupled to the timing distribution network receives the horizontal, vertical, or other composite synchronization signals and generates a local HDTV clock signal that is synchronized and locked to the HDTV primary reference.

Although the following describes a preferred embodiment of the present invention with respect to an NTSC-compliant signals and NTSC components, it would be apparent to one skilled in the art that the present invention may be employed with other video/audio standards, such as PAL.

Figure 1:
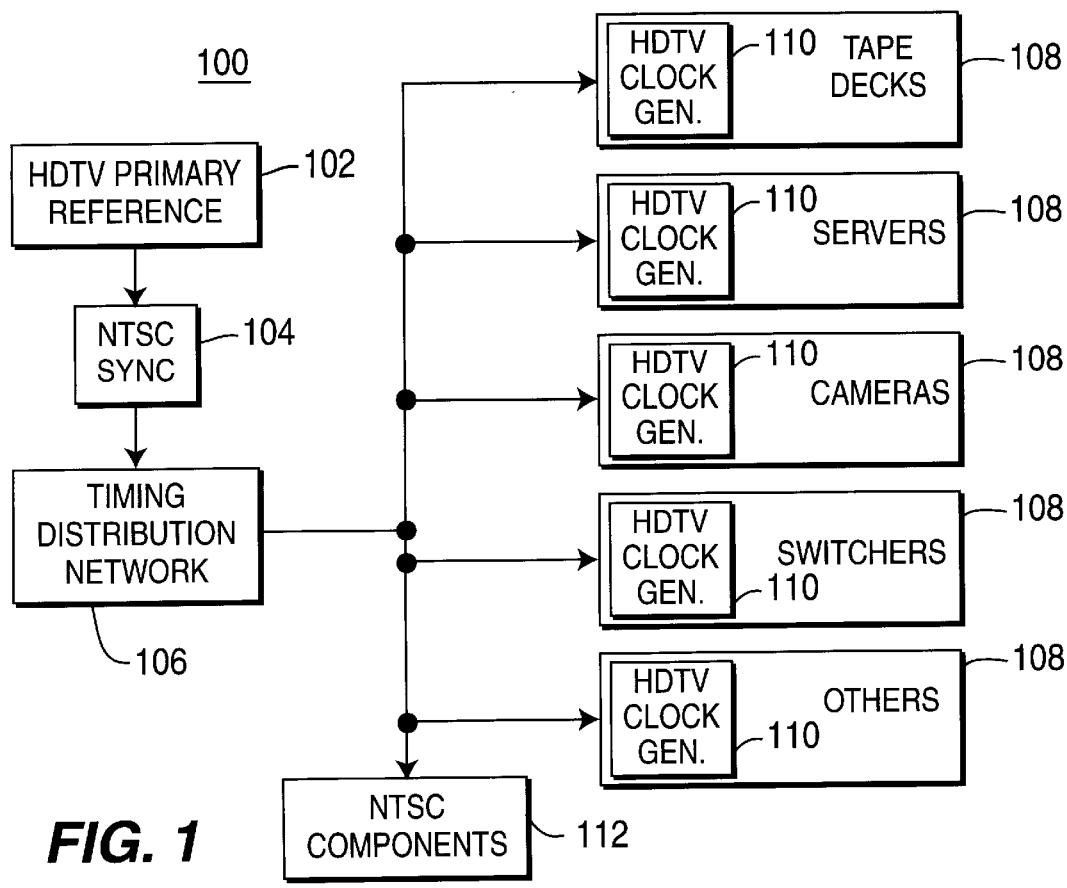
FIG. 1 shows an HDTV studio having a timing distribution of an HDTV primary reference in accordance with the present invention.

FIG. 1 shows a broadcast studio 100 network in accordance with the present invention including an HDTV primary reference 102, an NTSC synchronization (NTSC sync) signal generator 104, timing distribution network 106 and various HDTV components 108, such as HDTV-compliant digital video and audio equipment, each having one or more internal local HDTV clock generators 110. Broadcast studio 100 may also include, for example, NTSC-compliant video/audio equipment 112. Broadcast studio 100 may have a 27-MHz reference clock as an HDTV primary reference 102.

The NTSC sync signal generator 104 may be employed to generate NTSC-compliant signals such as horizontal, vertical and composite clock signals that are synchronized to the HDTV primary reference 102. These NTSC-compliant signals are then distributed through the broadcast studio 100 through timing distribution network 106 to local HDTV clock generators 110 of the digital components 108. The NTSC-compliant signals may also be distributed to NTSC video/audio equipment 112. For each digital video component 108, a respective HDTV clock generator 110 generates an HDTV clock signal from the NTSC-compliant signals that is synchronized to the HDTV primary reference 102 for the respective HDTV component 108.

Figure 2:
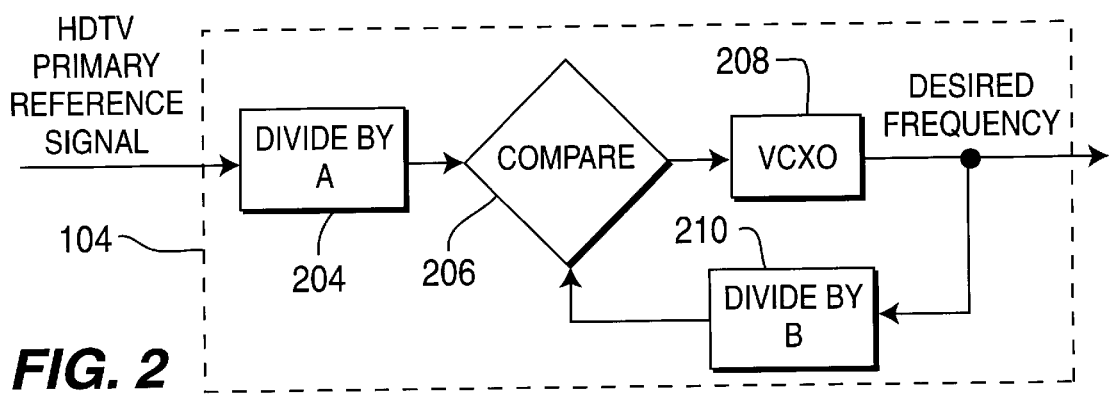
FIG. 2 shows an exemplary embodiment of an NTSC synchronization signal generator in accordance with the present invention for generating an NTSC-compliant signal synchronized to an HDTV primary reference.

FIG. 2 shows an exemplary embodiment of the NTSC sync signal generator 104 in accordance with the present invention for generating NTSC-compliant signals synchronized to the HDTV primary reference 102 that are provided to NTSC timing distribution network 106. NTSC sync signal generator 104 includes divide-by-A 204, comparator 206, voltage controlled crystal oscillator (VCXO) 208, and divide-by-B 210. While the following describes the operation of the NTSC sync signal generator 104 in the digital domain, the present invention is not so limited, and analog devices, or a combination of analog and digital devices may provide the operation of NTSC sync signal generator 104. As would be apparent to one skilled in the art, divide-by-A 204, comparator 206, VCXO 208 and divide-by-B 210 form a phase-locked loop frequency synthesizer.

In accordance with the present invention, the clock signal from the HDTV primary reference 102 is divided to a comparison frequency common to both a frequency of the HDTV primary reference 102 and a desired frequency of the NTSC-compliant signal. The HDTV primary reference 102 is divided by "A" by divide-by-A 204 and provided to comparator 206. The NTSC-compliant signal from VCXO 208 is divided by "B" by divide-by-B 204 and also provided to comparator 206. Comparator 206 forms a comparison signal employed by VCXO 208 to generate the NTSC-compliant signal. Typical values for "A" and "B" of divide-by-A 204 and divide-by-B 210 and the corresponding NTSC-compliant signals synchronized to an HDTV primary reference 102 of 27-MHz are given in Table 1.

TABLE 1

| NTSC Frequency (Hz) | Comparison Frequency (Hz) | A for Divide by A | B for Divide by B |
|---|---|---|---|
| 60 | 60 | 450000 | 1 |
| 59.94 | 59.94 | 450450 | 1 |
| 15750 | 2250 | 12000 | 7 |
| 15734.26 | 2247.75 | 12012 | 7 |

The phase-locked loop frequency synthesizer of FIG. 2 may be employed to generate desired NTSC-compliant signals from VCXO 208 within the broadcast studio 100 that are synchronized to the HDTV primary reference 202. Consequently, other NTSC signals derived from these NTSC-compliant signals may also be synchronized to the HDTV primary reference 102. For the "B" values of the divide-by-B 210 given in Table 1, divide-by-B 210 need not be employed, but rather replaced by a simple feedback path from the output of the VCXO 108 to the comparator 206. As would be apparent to one skilled in the art, several NTSC sync signal generators 104 may be employed in broadcast studio 100 to generate several different desired frequencies. The NTSC-compliant signals are then distributed concurrently throughout the broadcast studio 100 employing an NTSC distribution network 106 of the broadcast studio 100 as shown in FIG. 1.

Figure 3:
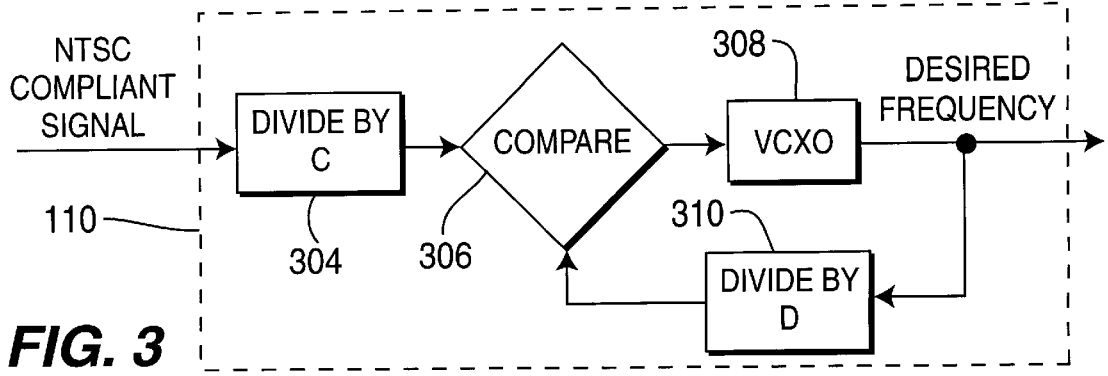
FIG. 3 shows an exemplary embodiment of a local HDTV clock generator in accordance with the present invention for generating a local HDTV clock signal from an NTSC-compliant signal received from a timing distribution network.

FIG. 3 shows an exemplary embodiment of the local HDTV clock generator 110 in accordance with the present invention for generating a local HDTV clock signal from the NTSC-compliant signals received from timing distribution network 106. Local HDTV clock generators 110 include divide-by-C 304, comparator 306, VCXO 308, and divide-by-D 310. While the following describes the operation of the digital clock generators 110 in the digital domain, the present invention is not so limited, and analog devices, or a combination of analog and digital devices may provide the operation of local HDTV clock generator 110.

As would be apparent to one skilled in the art, comparator 306, VCXO 308 and divide-by-B 310 form a phase-locked loop (PLL) frequency synthesizer in which VCXO 308 provides the local HDTV clock signal synchronized to the NTSC-compliant signal. The local HDTV clock signal synchronized to the HDTV primary reference 102 may be provided at the receive side of the NTSC timing distribution network 106 for use by digital video equipment 108 by using a phase-locked loop (PLL) frequency synthesizer providing an HDTV clock signal of the desired frequency. The NTSC-compliant signal from timing distribution network 106 is divided by "C" by divide-by-C 304 and provided to comparator 306. The local HDTV clock signal from VCXO 308 is divided by "D" by divide-by-D 304 and also provided to comparator 306. Comparator 306 forms a comparison signal employed by VCXO 308 to generate the local HDTV clock signal.

The local HDTV clock signal may typically be a clock signal having the same frequency as that of the HDTV primary reference 102. For example, a 27-MHz clock signal may be generated as the local HDTV clock signal, but other clock signals of different frequency related to the HDTV primary reference clock signal may also be provided by the phase-locked loop frequency synthesizer. Consequently, NTSC and new HDTV digital devices, such as MPEG-2 equipment, may be operated concurrently within an existing NTSC studio using the existing synchronization distribution network without disturbing synchronization of NTSC signals.

In accordance with the present invention, the clock signal of the NTSC-compliant signal is divided, such as by counting down by a value "C" in the digital domain, to a comparison frequency common to both the desired local HDTV clock signal and the NTSC-compliant signal. Typical divide values for "C" and "D" of divide-by-C 304 and divide-by-D 310 to generate a local HDTV clock signal of 27-MHz from the NTSC signals synchronized to an HDTV primary reference 102 are given in Table 2. As before, a ratio of the input signal frequency to the desired output signal frequency is equivalent to the ratio of C to D, and if a "D" value is one, the divide-by-D 310 need not be used and replaced with a simple feedback loop.

TABLE 2

| NTSC Frequency (Hz) | Comparison Frequency (Hz) | C for Divide-by-C | D for Divide-by D |
|---|---|---|---|
| 60 | 60 | 1 | 450000 |
| 59.94 | 59.94 | 1 | 450450 |
| 15750 | 2250 | 7 | 12000 |
| 15734.26 | 2247.75 | 7 | 12012 |

Thus, there is provided a system and method of distribution of a new digital timing reference in an HDTV digital broadcast studio, for example a 27-MHz Program Clock Reference found in MPEG-2 compliant systems, by an existing NTSC distribution network. Such existing NTSC distribution network may be present in an existing NTSC broadcast studio that is converted to an HDTV digital broadcast studio. Although the devices are illustrated and described herein with reference to certain specific embodiments, the present invention is nevertheless not intended to be limited to the devices shown. Rather, it is understood that various modifications may be made to the devices by those skilled in the art within the scope and range of equivalents of the claims and without departing from the spirit of the invention.

What is claimed is:

1. A method of synchronizing components to an HDTV primary reference clock signal comprising the steps of:
   a) generating a video sync signal synchronized to the HDTV primary reference clock signal;
   b) providing the video sync signal to a timing distribution network;
   c) distributing the video sync signal through the timing distribution network to one or more of the components; and
   d) generating, within each component, a local HDTV clock signal from the video sync signal, wherein the local HDTV clock signal is synchronized to the HDTV primary reference clock signal.

2. The method as recited in claim 1, wherein step a) comprises the steps of:
   a1) comparing an input signal based on the HDTV primary reference clock signal and a feedback signal based on the video sync signal; and
   a2) generating the video sync signal in accordance with the comparison.

3. The method as recited in claim 2, wherein step a1) comprises the step of dividing at least one of the HDTV primary reference clock signal and the video sync signal by a specified value to generate at least one of the input signal and the feedback signal.

4. The method as recited in claim 1, wherein step d) comprises the steps of:
   d1) comparing an input signal based on the video sync signal and a feedback signal based on the local HDTV clock signal; and
   d2) generating the local HDTV clock signal in accordance with the comparison.

5. The method as recited in claim 4, wherein step d1) comprises the step of dividing at least one of the local HDTV clock signal and the video sync signal by a specified value to generate at least one of the input signal and the feedback signal.

6. The method as recited in claim 1, wherein the HDTV primary reference clock signal has a frequency of 27-MHz, and the video sync signal is either an NTSC vertical, horizontal or composite timing signal.

7. The method as recited in claim 6, wherein the timing distribution network is part of an NTSC broadcast studio, the method enabling the NTSC broadcast studio to operate as an HDTV broadcast studio.

8. A system for synchronizing components to an HDTV primary reference clock signal comprising:
   a first phase-locked loop signal generator adapted to generate a video sync signal synchronized to the HDTV primary reference clock signal;
   a timing distribution network adapted to receive the video sync signal and distribute the video sync signal to one or more of the components; and
   a second phase-locked loop signal generator within each component and adapted to generate a local HDTV clock signal from the video sync signal, wherein the local HDTV clock signal is synchronized to the HDTV primary reference clock signal.

9. The system as recited in claim 8, wherein the first phase-locked loop signal generator comprises:
   a comparator adapted to compare an input signal derived from the HDTV primary reference clock signal and a feedback signal derived from the video sync signal; and
   a video sync signal generator adapted to generate the video sync signal based on an output signal of the comparator.

10. The system as recited in claim 9, wherein the first phase-locked loop signal generator further comprises a first divider adapted to divide the HDTV primary reference clock signal to generate the input signal, and a second divider adapted to divide the video sync signal to generate the feedback signal.

11. The system as recited in claim 8, wherein the second phase-locked loop signal generator comprises:
   a comparator adapted to compare a feedback signal derived from the local HDTV clock signal and an input signal derived from the video sync signal; and
   a local HDTV clock signal generator adapted to generate the local HDTV clock based on an output from the comparator.

12. The system as recited in claim 11, wherein the second phase-locked loop generator further comprises a first divider adapted to divide the video sync signal to generate the input signal, and a second divider adapted to divide the local HDTV clock signal to generate the feedback signal, wherein the local HDTV clock signal and the video sync signal have a common frequency.

13. The system as recited in claim 8, wherein the HDTV primary reference clock signal has a frequency of 27-MHz, and the video sync signal is either an NTSC vertical, horizontal or composite timing signal.

14. The system as recited in claim 13, wherein the timing distribution network is part of an NTSC broadcast studio having NTSC components and HDTV components, the timing distribution network synchronizing the NTSC components and the HDTV components to the HDTV primary reference clock signal.

* * * * *